United States Patent
Bevc et al.

(10) Patent No.: US 11,383,329 B2
(45) Date of Patent: Jul. 12, 2022

(54) METHOD FOR PRODUCING A WORKPIECE COMPOSITE, AND WORKPIECE COMPOSITE

(71) Applicant: Bayerische Motoren Werke Aktiengesellschaft, Munich (DE)

(72) Inventors: Boris Bevc, Munich (DE); Bernhard Glueck, Fuerstenfeldbruck (DE); Robert Kirschner, Olching (DE); Robert Lindacher, Hilgertshausen-Tandern (DE); Dietmar Opel, Aich Moosburg a.d.Isar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 329 days.

(21) Appl. No.: 16/432,074

(22) Filed: Jun. 5, 2019

(65) Prior Publication Data

US 2019/0283188 A1    Sep. 19, 2019

Related U.S. Application Data

(63) Continuation of application No. PCT/EP2018/052227, filed on Jan. 30, 2018.

(30) Foreign Application Priority Data

Mar. 23, 2017    (DE) .................... 10 2017 204 919.7

(51) Int. Cl.
*B23K 1/00*    (2006.01)
*B23K 33/00*    (2006.01)
(Continued)

(52) U.S. Cl.
CPC ................ *B23K 33/00* (2013.01); *B23K 1/14* (2013.01); *B23K 31/02* (2013.01); *B23K 33/008* (2013.01);
(Continued)

(58) Field of Classification Search
CPC .... B23K 33/004; B23K 33/00; B23K 35/226; B23K 2101/185; B23K 2101/18; B23K 26/24
See application file for complete search history.

(56) References Cited

U.S. PATENT DOCUMENTS 1,812,123 A * 6/1931 Stresau .................. B23K 9/035
219/137 R
3,328,556 A * 6/1967 Nelson .................. B23K 9/035
219/137 R
(Continued)

FOREIGN PATENT DOCUMENTS

CN    101844185 A    9/2010
CN    103567613 A    2/2014
(Continued)

OTHER PUBLICATIONS

AWS (Structural Welding Code-Steel, 20th Edition, 2006) (Year: 2006).*
(Continued)

*Primary Examiner* — Erin B Saad
(74) *Attorney, Agent, or Firm* — Crowell & Moring LLP

(57) ABSTRACT

A workpiece composite and a method for producing the workpiece composite having at least two workpieces are provided. A first workpiece and a second workpiece are positioned relative to each other, and an integral connection between the end face of the first workpiece and the second workpiece is formed in a joint section by way of a thermal joining method. Prior to forming the integral connection, the first workpiece is provided with an indentation or embossing, which adjoins the end face, at least in the joint section, whereby the thickness of the first workpiece is reduced in the region of the end face.

7 Claims, 3 Drawing Sheets

(51) Int. Cl.
*B23K 1/14* (2006.01)
*B23K 31/02* (2006.01)
B23K 103/20 (2006.01)
B23K 101/18 (2006.01)
B23K 101/34 (2006.01)
B23K 101/00 (2006.01)

(52) U.S. Cl.
CPC .... *B23K 2101/006* (2018.08); *B23K 2101/18* (2018.08); *B23K 2101/34* (2018.08); *B23K 2103/20* (2018.08)

(56) References Cited

U.S. PATENT DOCUMENTS

| | | | | |
|---|---|---|---|---|
| 3,532,611 A * | 10/1970 | Takiguchi | ............... | C23C 22/74 205/688 |
| 3,748,429 A * | 7/1973 | Agusa | .................. | B23K 33/004 219/73 |
| 3,825,712 A * | 7/1974 | Gibbs | ....................... | B23K 9/23 219/137 R |
| 4,079,163 A * | 3/1978 | Tanaka | .................. | B23K 35/226 228/203 |
| 4,098,749 A * | 7/1978 | Hoshino | .................. | C08K 5/54 524/557 |
| 4,145,598 A * | 3/1979 | Iio | ......................... | B23K 9/0352 219/137 R |
| 4,175,227 A * | 11/1979 | Kasper | ................. | B23K 9/0209 219/125.12 |
| 4,438,319 A * | 3/1984 | Blot | ......................... | B23K 9/09 219/130.51 |
| 5,343,010 A | 8/1994 | Urech | | |
| 5,558,159 A | 9/1996 | Kato | | |
| 5,623,003 A * | 4/1997 | Tanaka | .................... | C08G 59/12 525/438 |
| 5,789,718 A * | 8/1998 | Fukushima | .......... | B23K 11/087 219/83 |
| 8,167,188 B2 * | 5/2012 | Nakagawa | .......... | B29C 65/5035 228/112.1 |
| 8,733,619 B2 | 5/2014 | Lalam | | |
| 9,908,166 B2 * | 3/2018 | Flehmig | ................ | B21C 37/065 |
| 10,053,155 B2 | 8/2018 | Stein | | |
| 2004/0211819 A1 * | 10/2004 | Ezumi | .................. | B23K 20/126 228/112.1 |
| 2010/0159265 A1 * | 6/2010 | Fairchild | ................ | C22C 38/02 428/586 |
| 2010/0236316 A1 | 9/2010 | Flehmig | | |

FOREIGN PATENT DOCUMENTS

| | | | |
|---|---|---|---|
| DE | 1 933 799 | A1 | 1/1971 |
| DE | 2 214 748 | A1 | 9/1973 |
| DE | 693 11 462 | T2 | 10/1997 |
| DE | 197 53 103 | A1 | 6/1999 |
| DE | 199 47 751 | C1 | 6/2001 |
| DE | 10 2004 035 887 | A1 | 3/2006 |
| DE | 10 2006 015 947 | A1 | 10/2007 |
| DE | 10 2009 003 655 | A1 | 9/2010 |
| DE | 10 2010 027 182 | A1 | 1/2012 |
| DE | 10 2013 211 076 | A1 | 12/2014 |
| JP | 6-218542 | A | 8/1994 |
| JP | 7-32143 | A | 2/1995 |
| JP | 2012-135811 | A | 7/2012 |

OTHER PUBLICATIONS

Schamhis (DE102004035887A1) computer english translation (Year: 2004).*
International Search Report (PCT/ISA/210) issued in PCT Application No. PCT/EP2018/052227 dated May 4, 2018 with English translation (eight (8) pages).
German-language Written Opinion (PCT/ISA/237) issued in PCT Application No. PCT/EP2018/052227 dated May 4, 2018 (five (5) pages).
German-language Search Report issued in counterpart German Application No. 10 2017 204 919.7 dated Apr. 12, 2017 with partial English translation (13 pages).
Chinese-language Office Action issued in Chinese Application No. 201880005557.0 dated Apr. 13, 2021 with English translation (16 pages).
Chinese-language Office Action issued in Chinese Application No. 201880005557.0 dated Sep. 29, 2020 with English translation (15 pages).

* cited by examiner

METHOD FOR PRODUCING A WORKPIECE COMPOSITE, AND WORKPIECE COMPOSITE

CROSS REFERENCE TO RELATED APPLICATIONS

This application is a continuation of PCT International Application No. PCT/EP2018/052227, filed Jan. 30, 2018, which claims priority under 35 U.S.C. § 119 from German Patent Application No. 10 2017 204 919.7, filed Mar. 23, 2017, the entire disclosures of which are herein expressly incorporated by reference.

BACKGROUND AND SUMMARY OF THE INVENTION

The invention relates to a workpiece composite, in particular for a vehicle body, and to a method for producing a workpiece composite.

In pursuit of lightweight construction in the vehicle industry, sheet-metal components are increasingly being optimized in terms of weight. It is known to achieve weight savings by using composite components comprising a sheet-metal workpiece which is reinforced in accordance with the local loading.

Such reinforcements are achieved for example by reinforcing sheets that are provided locally on a base sheet in regions of particular loading. In the case of so-called tailored blanks, sheets of different thickness or strength are placed against one another and connected to one another in a specific manner, whereby a workpiece composite with locally varying properties is produced. Thus, for example, the document DE 10 2013 211 076 A1 discloses a body component in the form of a supporting rear panel which is made up of a middle part and at least two side parts that are joined by means of a welded connection. The middle part, which is designed as a lock counterpart for the lock of a tailgate, is preferably formed from a metal sheet with a greater material thickness than the side parts.

Here, the known methods and workpiece composites have limitations. For instance, the thermal joining of metal sheets with great differences in thickness leads to problems, and is not feasible for example from certain differences in thickness or in the case of unfavorable material pairings. In order nevertheless to produce workpiece composites with specific local reinforcements, complex structural design measures or joining methods are necessary.

Therefore, the object of the invention is to provide a possible way suitable for mass production in which the freedoms of design in the creation of workpiece composites can be increased.

A method is provided for producing a workpiece composite comprising at least two workpieces, in which a first workpiece and a second workpiece are positioned in relation to one another and are integrally joined to one another in a joining portion by a thermal joining method. The thermal joining method may be a welding method and/or a brazing method. In the case of welding, the material of the parts to be connected by a joining process is heated to above the liquidus temperature. The molten phases of the two workpieces mix and solidify after cooling to form an integral connection. A filler may be added to the molten pool. On the other hand, in the case of brazing, a molten phase is produced by melting a braze material. The workpieces themselves are not heated to above the liquidus temperature or are only melted superficially. As in the case of welding, an integral connection of the workpieces is produced after solidifying. For workpiece composites with greatly differing liquidus temperatures, a combination of welding and brazing may also be performed, for example in the case of a steel/aluminum composite a brazed connection may be formed on the steel side and a welded connection may be formed on the aluminum side, which is also referred to as weld brazing.

The integral connection is formed between an end face of the first workpiece and the second workpiece. For this purpose, the workpieces may for example be positioned in relation to one another in an overlapping arrangement, the first workpiece being arranged overlapping the second workpiece and the joining connection being produced for example as a fillet weld between the end face of the first workpiece and a flank of the second workpiece. The workpieces may also be arranged for example with a butt joint, wherein they may butt against one another or be arranged at a defined distance from one another. The joining connection with a butt joint may for example be formed as a plain butt joint weld, for which purpose the end face of the first workpiece is integrally connected to the end face of the second workpiece.

According to the invention, before the forming of the integral connection, the first workpiece is provided at least in the joining portion with an indentation adjoining the end face, whereby the thickness of the first workpiece is reduced in the region of the end face. The portion of the workpiece in which the joining connection is formed is referred to as the joining portion. The term "indentation" is used herein to refer to the feature of the thickness reduction in the region of the end face.

Preferably, the thickness of the first workpiece is locally reduced in such a way that joinable geometries or joining-optimized zones and/or thermal conditions between the first workpiece and the second workpiece are obtained. The local thickness reduction in the joining portion makes it possible to join workpieces with very great differences in thickness, for example more than 0.6 mm, nevertheless reliably. In particular, it is possible to reduce the thickness of the first workpiece in the joining portion in such a way that the first workpiece and the second workpiece have approximately equal thicknesses at the joining location. Moreover, the method also improves the joining of material pairings that are difficult to join, such as for example aluminum and steel, by corresponding adaptation of the thicknesses. For example, a steel workpiece may be formed as thin at the joining location and an aluminum workpiece may be formed as thick at the joining location. If workpieces with greatly differing electrochemical potentials, such as for example different steel alloys, are joined to one another or steel is joined to aluminum, the thickness reduction may have an influence on the composition of the diluted weld metal. The material transfer at the joining location can be specifically controlled for reducing the tendency to corrode.

When introducing the indentation, the material of the workpiece is upset and displaced in this region. Apart from the desired thickness reduction, there is advantageously a hardening, which is accompanied by a decrease in the susceptibility to edge cracking.

The indentation is formed at least in the joining portion. If the workpiece has more than one joining portion, all of the joining portions may be provided with an indentation, which may be different from one another or the same. It may similarly be advantageous to form a continuous indentation that connects a number of joining portions to one another. The indentation adjoins the end face of the first workpiece and may for example be formed along the entire edge of the workpiece or else running around the workpiece.

The form of the indentation is in principle undetermined and can be varied according to the requirements for the joining location. In an advantageous way, however, the thickness of the workpiece will decrease in the course of the indentation (seen from the inner-lying beginning of the indentation in the direction of the end face of the workpiece). It may be advantageous if, in one configuration, the indentation has the effect that the workpiece is provided with a bevel. In this way, the thickness of the workpiece is reduced linearly in the direction of the end face and a sloping face with respect to the workpiece surface is produced. The sloping face may directly adjoin the end face, but for production reasons a small offset or a plateau, which may for example have a width of less than 1 mm, may be formed between the sloping face and the end face. The angle of the bevel may be varied and advantageously lie for example in a range of 20 to 70 degrees or in a range of 30 to 60 degrees.

The indentation can be reliably produced with little extra effort, for example by stamping, roll-stamping, rolling or knurling. Advantageously, the method does not require any additional process steps. Thus, in one configuration, the production of the indentation may be integrated in a process step for producing the workpiece. In this configuration, the indentation is therefore produced in a process step that is already provided in the process of producing the workpiece. Thus it is contemplated for example to form the indentation already in the rolling mill when producing sheet blanks or semifinished sheets. If the workpieces are shaped sheet-metal parts, the indentation may also be formed during the shaping of the components, for example in a press-bound process. For example, appropriate stamping noses may be provided, for example on the punch or hold-down device, in the pressing tools.

It is particularly advantageous if, in one configuration of the method, the indentation is produced in the same process step in which the end face is produced by trimming or severing the first workpiece. In particular for metallic sheet-metal components, the formation of burr during cutting and the formation of burr by flaking can be reduced or prevented. If the method is conducted in this way, the indentation is for example first produced in a pressing tool by a hold-down device and a corresponding stamping punch. During the further closing of the pressing tool, a cutting die for example then severs the workpiece in the indentation or adjoining the indentation, whereby the end face is produced. When severing or cutting, at least part of the indentation on the first workpiece remains.

The method according to the invention can be applied to all weldable workpieces. The method is suitable in particular for producing metallic workpiece composites. The workpieces may be for example individual sheet blanks, which are joined by the method to form a sheet blank composite in the form of a tailored blank. One or more reinforcing sheets may be applied to a sheet blank. However, the method is not restricted to semifinished products, but may also be used in order to connect components, in particular shaped sheet-metal parts, to one another to form a component composite or to reinforce individual components with one or more reinforcing sheets. The workpieces used may also be of a single-layer or multi-layer construction or take the form of sandwich workpieces, which comprise layers of metal and plastic. In one configuration, sheets or shaped sheet-metal parts of thicknesses that differ from one another by more than 0.6 mm are joined by the method.

The method achieves particular advantages if the workpiece provided with the stamping is already provided in advance with a surface coating. In the context of the invention, a surface coating is understood as meaning a functional coating which is applied to the surface of the workpiece for esthetic reasons, for functionalizing the workpiece, for reasons of protection or stability and in particular for reasons of chemical or mechanical stability. The surface coating may be of a one-layer or multi-layer construction, be integrally connected to the workpiece or lie loosely on it. The surface coating may be applied only partially or over the entire surface of the workpiece. The workpiece may have the surface coating only on the side on which the indentation is formed or likewise on the opposite side.

By the stamping operation, the surface coating is pressed in together with the base material of the workpiece, so that the surface coating is at least partially retained in the region of the indentation. In the region of the indentation, the surface coating may have a smaller thickness than on the rest of the workpiece or be only partially present, for example it may be that in the region of the indentation only 40% or 70% of the surface of the workpiece is still covered with the surface coating. The functionality introduced by the surface coating is also retained in the region of the indentation after the severing of the workpiece. If the surface coating is for example an anticorrosion layer, the method makes improved corrosion protection possible. Depending on the surface coating that is used, additional functionalities may also be introduced into the workpiece, such as for example adhesion layers or layers of a filler required for the joining process, such as for example a braze material. In one configuration, the surface coating may be for example an adhesion coating, an anticorrosion coating or a braze coating. It is possible to dispense with finishing of the workpiece for additional functionalization or sealing, whereby material costs and labor can be saved.

The indentation may be formed only on the first workpiece. However, it is also contemplated that the second workpiece is likewise provided with an indentation, in order advantageously to geometrically shape the workpieces specifically at the joining location, for example a geometry for producing a single-V butt weld. In one configuration of the invention, it may therefore be envisaged likewise to provide the second workpiece with an indentation in the joining portion, which reduces the thickness of the second workpiece in the joining portion. The indentation in the second workpiece may be formed as described above in relation to the first workpiece; in particular, the second workpiece may also have a surface coating.

Also provided is a workpiece composite of at least two workpieces, in which a first workpiece and a second workpiece are connected in a joining portion by an integral connection produced by a thermal joining method. The integral connection is formed between an end face of the first workpiece and the second workpiece. According to the invention, the first workpiece is provided at least in the joining portion with an indentation adjoining the end face in such a way that the thickness of the first workpiece is reduced in the region of the end face by the indentation.

In a preferred configuration, the indentation is formed as a bevel running along the end face of the workpiece. The first workpiece may, in one configuration, have a surface coating and this surface coating is partially retained in the region of the indentation. The workpiece composite may in particular be produced by the method described above and, as such, achieves the same technical effects and advantages as are described for the method.

The invention has the effect in particular of making new freedoms of design possible in the creation and layout of tailor-welded blanks or shaped sheet-metal components. It becomes possible to reliably join workpieces with great differences in thickness, for example with difference in thicknesses of more than 0.6 mm. Moreover, in particular lap-welded connections of sheets with great differences in thickness become possible. Furthermore, previously unused weld forms, such as for example single-V butt welds, can be used for joining workpieces of different thicknesses. Workpieces of different materials can be joined in an improved manner, for example different steel alloys or steel with aluminum. The outgassing problem with coated sheets is reduced. Moreover, the heat-affected zone at the joining location can be controlled by the type and configuration of the indentation.

The properties, features and advantages of this invention described above and the manner in which they are achieved will become clearer and more clearly understandable from the drawing and in conjunction with the following description of the exemplary embodiments. Where the term "can" or "may" is used in this application, it relates both to the technical possibility and to the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
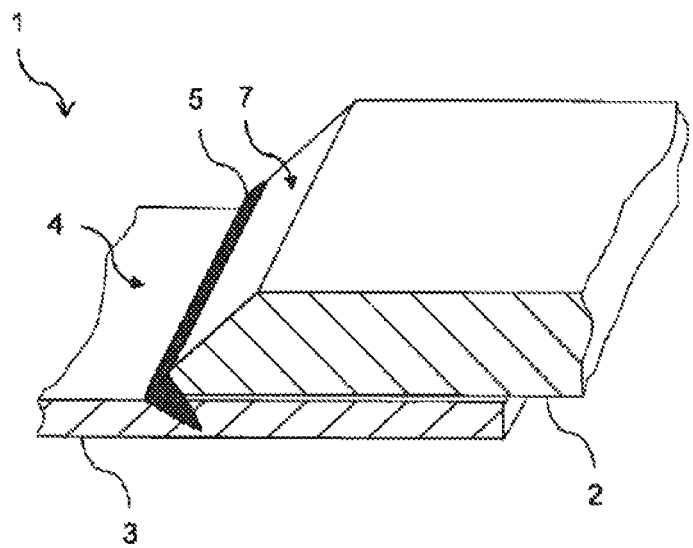
FIG. 1 is a basic diagram of a workpiece composite produced by the method.

FIG. 1 is a basic diagram of a workpiece composite 1 given by way of example, which has been produced by the method disclosed here.

The workpiece composite 1 comprises a first workpiece 2, which is arranged overlapping with a second workpiece 3, and in a joining portion 4 is connected to the second workpiece 3 by way of an integral joining connection 5. The joining connection 5 is formed by way of example as an edge fillet weld between an end face 6 of the first workpiece 2 and the second workpiece 3. The edge fillet weld 5 may also be referred to as a side fillet weld.

Figure 2:
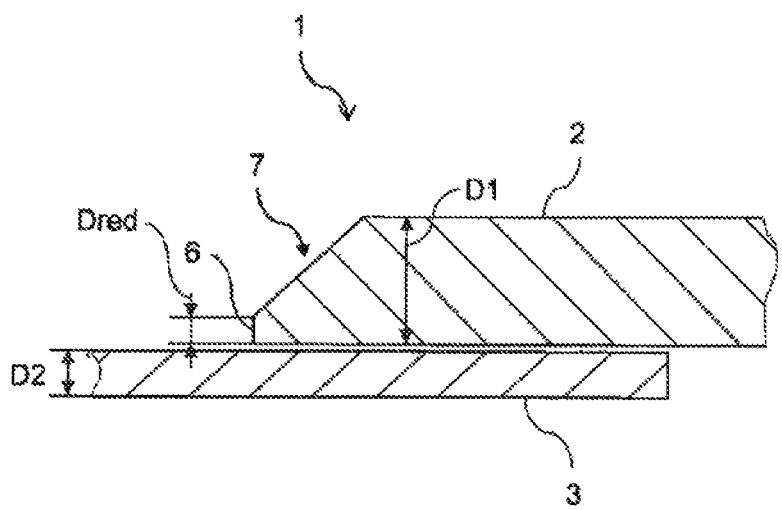
FIG. 2 shows a configuration by way of example for producing a workpiece composite by an exemplary method according to the invention.

FIG. 2 shows the workpiece composite 1 from FIG. 1 before the forming of the weld seam 5. The first workpiece 2 and the second workpiece 3 have very different thicknesses D1 and D2, which for example differ from one another by more than 0.6 mm. In order to improve the weldability of the two workpieces, before the forming of the edge weld seam 5, an indentation 7 has been produced in the first workpiece 2. The indentation 7 adjoins the end face 6 and is formed in such a way that the thickness $D_{red}$ of the first workpiece 2 at the end face 6 is reduced in comparison with the original workpiece thickness D1. In particular, the indentation 7 has the effect of producing a joining geometry in the joining portion 4 with which the joining of the workpieces is possible by conventional thermal joining methods, such as for example welding, in spite of great differences in thickness. By analogy, it is of course similarly possible to connect the workpieces for example by way of weld brazing or brazing. Correspondingly, the joining connection 5 may also be formed as a brazed connection or as a welded/brazed connection.

Figure 3:
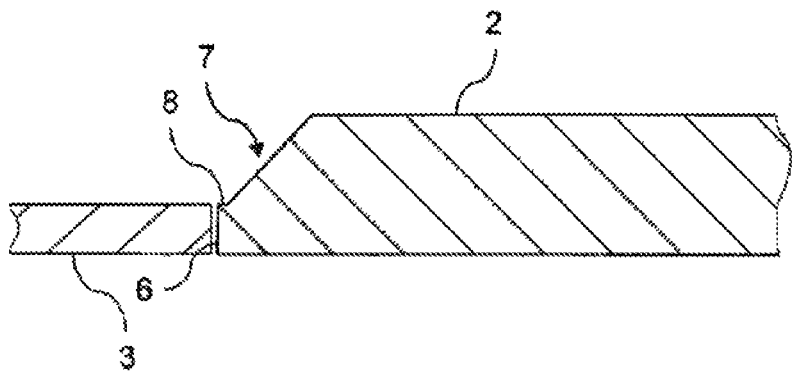
FIG. 3 shows a configuration by way of example for producing a workpiece composite by an exemplary method according to the invention.

While in FIG. 1 the workpieces are arranged in an overlapping arrangement, other arrangements, such as for example the arrangement shown in FIG. 3 with a butt joint, are similarly possible. Here, the indentation 7 may be formed in such a way that the workpieces to be connected have substantially the same thickness at their end faces.

Figure 4:
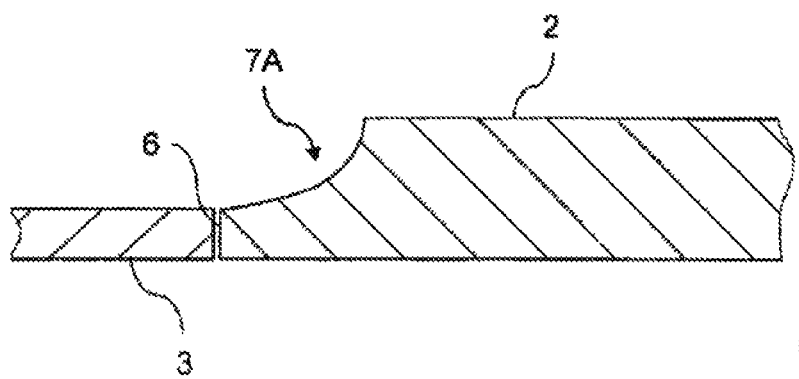
FIG. 4 shows a configuration by way of example for producing a workpiece composite by an exemplary method according to the invention.

The indentation 7 represented in FIGS. 1 to 3 has the effect that the first workpiece is provided toward the end face 6 with a bevel. In the region of the bevel, the thickness of the first workpiece is reduced linearly, when seen from the original thickness D1 in the direction of the end face 6. For production reasons, there may be a small plateau 8 at the transition from the end face 6 to the bevel, as represented in FIG. 3. Nevertheless, the indentation 7 may also have other forms, for example a rounded form, as represented by way of example on the basis of the indentation 7A in FIG. 4.

The indentation 7, 7A is formed in the first workpiece before the integral connection is produced. The indentation may be produced already during the production of the first workpiece 2, for example in the rolling mill or in a forming step for shaping the first workpiece 2. It is particularly preferred if the indentation 7 is produced in the same process step in which the end face 6 is also produced by trimming or severing the first workpiece 2.

Figure 5:
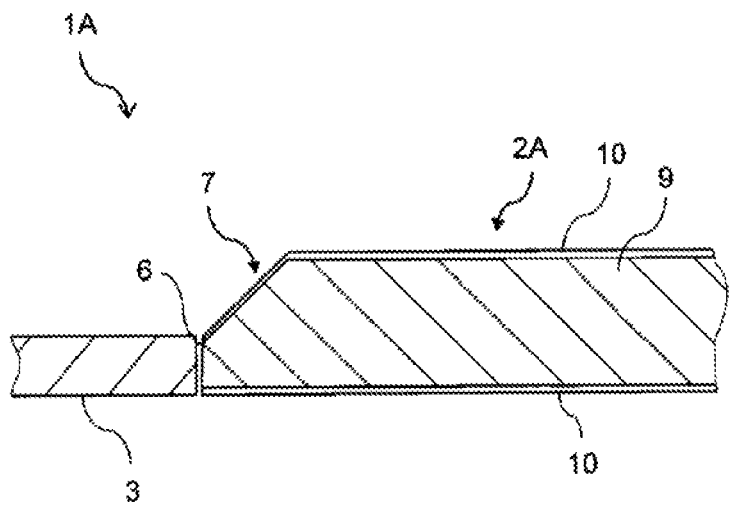
FIG. 5 shows a configuration by way of example for producing a workpiece composite by an exemplary method according to the invention.

The method is particularly advantageous if the first workpiece 2 has a surface coating. The surface coating may be for example an anticorrosion coating, an adhesion coating or some other functional surface coating. It may for example be applied integrally to the first workpiece or lie loosely on it. FIG. 5 shows by way of example a not yet joined workpiece composite 1A in the case of which the first workpiece 2A comprises a main body 9, which is provided with a surface coating 10 completely on both surfaces. The forming of the indentation 7 has the effect that part of the main body 9 and the surface coating 10 located on it are depressed. The resultant recompaction has the effect that the surface coating 10 possibly has a thinner layer thickness in the region of the indentation 7 than in the remaining region of the workpiece. The surface coating 10 is preferably retained up to the end face 6. It is thus possible to introduce the surface coating specifically into the region of the indentation 7. If for example an adhesive coating or a brazing film is used as the surface coating 10, it can be specifically introduced into the indentation 7, and as far as into the joining region, by the method. Subsequent sealing or finishing of the indentation 7 is unnecessary. Workpiece composites can be produced with great functionality and little additional production expenditure.

Figure 6:
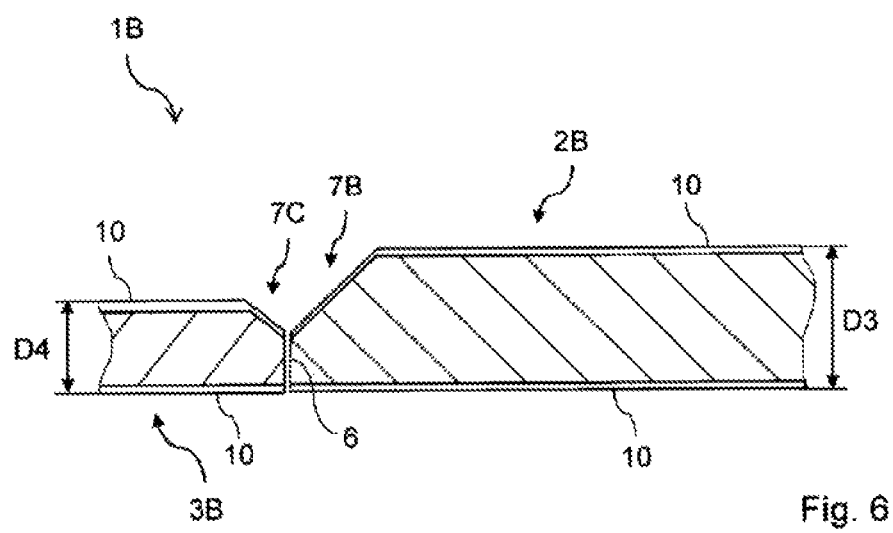
FIG. 6 shows a configuration by way of example for producing a workpiece composite by an exemplary method according to the invention.

Similarly, the second workpiece 3 may be provided with an indentation as described for the first workpiece. FIG. 6 shows a further workpiece composite 1B, given by way of example, before forming the integral joining connection, in which both the first workpiece 2B and the second workpiece 3B are provided with a surface coating 10. Indentations 7B and 7C have the effect that both workpieces are provided with a bevel, so that the thickness of the workpieces D3 and D4 decreases toward the end face 6 and a single-V butt weld becomes possible in spite of the very different workpiece thicknesses.

The first workpiece and the second workpiece are not specifically restricted and may for example be a semifinished product, such as for example a sheet blank, or a component, such as for example a sheet-metal component or a sandwich component. The workpieces preferably have thicknesses in the range of up to 4 mm. The invention is both suitable for connecting individual sheet blanks to form a tailored blank, such as for example a tailor-welded blank, or for applying one or more reinforcing sheets to a sheet blank or a shaped sheet-metal component. Similarly, the invention can also be used for joining shaped sheet-metal components to one another to form a component composite. In particular, workpieces with thicknesses differing greatly from one another can be reliably joined to one another.

The same reference signs denote the same elements. The exemplary embodiments are not true to scale and are not restrictive. Modifications within the routine activities of a person skilled in the art are possible.

LIST OF REFERENCE SIGNS 1, 1A, 1B workpiece composite
2, 2A, 2B, 3, 3B workpieces
4 joining portion
5 integral connection
6 end face
7, 7A, 7B indentation
8 plateau
9 main body
10 surface coating
D1, D2, $D_{red}$ thickness The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a workpiece composite comprising at least two workpieces, in which a first workpiece and a second workpiece are positioned in relation to one another wherein the first workpiece is arranged overlapping the second workpiece, the method comprising the acts of:

forming a fillet weld between an end face of the first workpiece and a flank of the second workpiece in a joining portion by a thermal joining method; and before forming the fillet weld, providing the first workpiece at least in the joining portion with an indentation adjoining the end face, whereby a thickness of the first workpiece is reduced in the region of the end face, wherein the first workpiece is already provided with a surface coating in a form of an anticorrosion layer before the indentation is provided, and wherein the surface coating is at least partially retained in the region of the indentation.

2. The method according to claim 1, wherein
the indentation provides the first workpiece with a bevel.

3. The method according to claim 1, wherein
the indentation is produced in a same process step in which the end face is produced by severing or trimming of the first workpiece.

4. The method according to claim 1, wherein
the second workpiece is provided in the joining portion with an indentation, which locally reduces a thickness of the second workpiece.

5. A workpiece composite of at least two workpieces, comprising:

a first workpiece and a second workpiece, wherein the first workpiece is arranged overlapping the second workpiece and wherein the first workpiece and the second workpiece are connected in a joining portion by a fillet weld produced by a thermal joining method, wherein the fillet weld is formed between an end face of the first workpiece and a flank of the second workpiece, the first workpiece is provided at least in the joining portion with an indentation adjoining the end face such that a thickness of the first workpiece is reduced in the region of the end face by the indentation, wherein the first workpiece is already provided with a surface coating in a form of an anticorrosion layer before the indentation is provided, and wherein the surface coating is at least partially retained in the region of the indentation.

6. The workpiece composite according to claim 5, wherein
the indentation is a bevel running along the end face of the workpiece.

7. A workpiece composite comprising at least two workpieces, wherein
the workpiece composite is produced by the method of claim 1.

* * * * *